(12) United States Patent
Yang et al.

(10) Patent No.: US 6,449,132 B1
(45) Date of Patent: Sep. 10, 2002

(54) DIELECTRIC GAP MATERIAL FOR MAGNETORESISTIVE HEADS WITH CONFORMAL STEP COVERAGE

(75) Inventors: Liu Yang, Eden Prairie; Jumna Ramdular, Brooklyn Park; Sara L. Gordon; Ralph D. Knox, both of Minneapolis; John E. Dzarnoski, Watertown, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/522,517

(22) Filed: Mar. 10, 2000

Related U.S. Application Data

(60) Provisional application No. 60/157,899, filed on Oct. 5, 1999.

(51) Int. Cl.[7] .................................................. G11B 5/39
(52) U.S. Cl. ....................................................... 360/317
(58) Field of Search ............................... 360/317–318.1

(56) References Cited

U.S. PATENT DOCUMENTS

| | | | |
|---|---|---|---|
| 4,469,747 A | 9/1984 | Sasaki et al. ............... 428/325 |
| 4,692,344 A | 9/1987 | Kaganowicz et al. ......... 427/39 |
| 5,225,286 A | 7/1993 | Fujikawa et al. ............ 428/426 |
| 5,707,538 A | * 1/1998 | Shen .......................... 360/113 |
| 5,723,909 A | 3/1998 | Yano et al. .................. 257/760 |
| 5,818,684 A | * 10/1998 | Iwasaki ....................... 360/113 |
| 5,878,481 A | * 3/1999 | Feng ....................... 29/603.15 |
| 5,950,101 A | 9/1999 | Yano et al. ................. 438/618 |
| 6,103,073 A | * 8/2000 | Thayamballi ............ 204/192.2 |
| 6,204,071 B1 | * 3/2001 | Ju ............................... 360/113 |
| 6,301,077 B1 | * 10/2001 | Sasaki ......................... 360/126 |
| 6,310,751 B1 | * 10/2001 | Guo ....................... 360/327.32 |

* cited by examiner

Primary Examiner—A. J. Heinz
(74) Attorney, Agent, or Firm—Kinney & Lange, P.A.

(57) ABSTRACT

A silicon nitride dielectric film for use in an MR head according to the present invention comprises from about 38% to 44% by volume of Si, from about 35% to 37% by volume of N, and from about 21% to 24% by volume of H. The dielectric film is formed by plasma enhanced chemical vapor deposition (PECVD) at relatively low temperatures. A plurality of gases capable of reacting to form silicon nitride are introduced into a PECVD reactor. An electric field is generated in the reactor to produce a plasma. The gases in the reactor react in the presence of the electrical field to form a silicon nitride dielectric film.

18 Claims, 5 Drawing Sheets

DIELECTRIC GAP MATERIAL FOR MAGNETORESISTIVE HEADS WITH CONFORMAL STEP COVERAGE

CROSS-REFERENCE TO RELATED APPLICATION(S)

This application claims the benefit of the filing date of U.S. provisional application Ser. No. 60/157,899 entitled "A DIELECTRIC GAP MATERIAL FOR MAGNETORESISTIVE HEADS WITH CONFORMAL STEP COVERAGE," which was filed Oct. 5, 1999. This application is related to a U.S. patent application entitled "DATA SENSOR INCLUDING LAYERED DIELECTRIC GAP," which was filed in the name of the applicants Liu Yang, Helen Chung, and Jumna Ramdular on Mar. 10, 2000, and which bears attorney docket number 5933/021.

BACKGROUND OF THE INVENTION

The present invention relates to magnetoresistive heads, and more particularly to a dielectric gap material for use in MR heads and a method for forming the dielectric gap material.

In recent years, there has been a drastic increase in magnetic recording density. As the areal density of the magnetoresitive head increases, the physical size of the head continues to shrink. This trend to smaller head geometry places a great challenge in MR head manufacturing, requiring much thinner and more reliable dielectric gap layers that separate MR sensor stacks from magnetic shields.

Typically, $Al_2O_3$ (alumina) is used as a dielectric gap material for MR heads, and is deposited using a conventional sputtering process. Since the sputtering process is a line-of-sight process, the sputtered $A_2O_3$ does not provide a good step coverage on the topography of MR sensors. Conventional sputtered $Al_2O_3$ gap material only has a step coverage of less than about 35 percent. MR heads often have big topographical changes resulting in steep vertical walls. With the conventional sputtered $Al_2O_3$ process, flat areas of the MR head are covered adequately, but vertical or near vertical steps are covered much thinner. The thin coverage can result in reader to shield shorting and a failure of the device.

In addition to providing better step coverage, it would also be desirable for a dielectric gap material to have a higher breakdown voltage and lower leakage current than currently used materials to provide more effective isolation for MR sensor stacks. The increased isolation makes devices more resistant to electrostatic discharge (ESD).

It would be desirable for the process of forming the dielectric gap material to be compatible with currently used MR head manufacturing processes. Conventional chemical vapor deposition (CVD) would not be a good choice for forming a dielectric gap material because of the requirement for a high temperature during the deposition. Conventional CVD to form dielectric films requires temperatures well in excess of 200° C. Such high temperatures would ruin an MR head. In order to be compatible with currently used MR head manufacturing processes, the deposition of the dielectric gap material should be performed at relatively low temperatures.

It would also be desirable for the process for forming the dielectric material to not be restricted to line-of-sight deposition. Rather, the process should be performed at pressures above the molecular flow region and should use a high throwing power to produce improved step coverage on difficult three-dimensional topographies.

BRIEF SUMMARY OF THE INVENTION

A silicon nitride dielectric film for use in an MR head according to the present invention comprises from about 38% to 44% by volume of Si, from about 35% to 37% by volume of N, and from about 21% to 24% by volume of H. The dielectric film is formed by plasma enhanced chemical vapor deposition (PECVD) at relatively low temperatures. A plurality of gases capable of reacting to form silicon nitride are introduced into a PECVD reactor. An electric field is generated in the reactor to produce a plasma. The gases in the reactor react in the presence of the electrical field to form a silicon nitride dielectric film.

The PECVD deposited silicon nitride dielectric film of the present invention provides excellent step coverage, high breakdown voltage and a low leakage current. The process for forming this silicon nitride dielectric film is compatible with currently used MR head manufacturing processes because relatively low temperatures may be used during the deposition.

DETAILED DESCRIPTION

Figure 1:
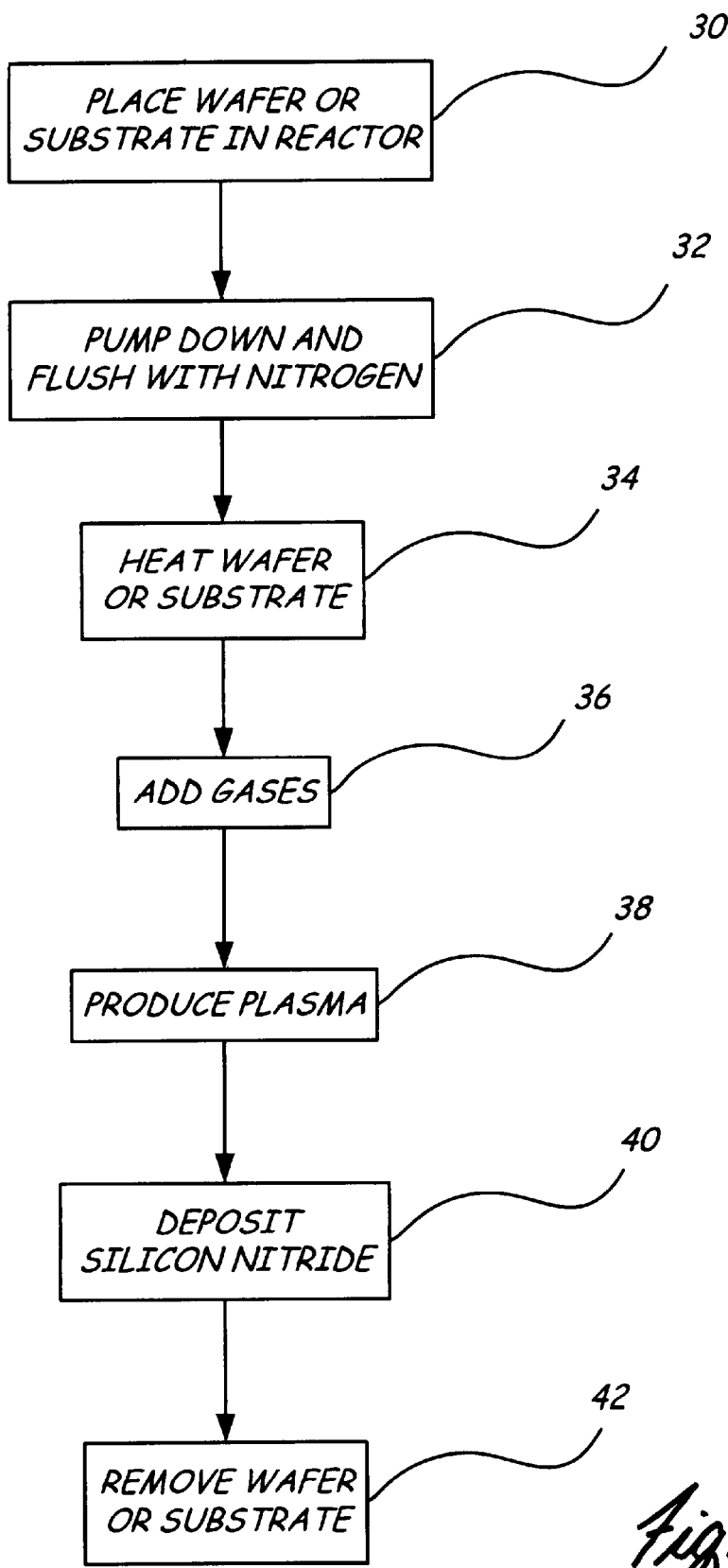
FIG. 1 shows an MR head which incorporates the dielectric gaps of the present invention.

FIG. 1 shows an MR head which incorporates the dielectric gaps of the present invention. MR head 10 includes first shield 12, first dielectric gap layer 14, sensor stack 16, second dielectric gap layer 18, second shield 20, spacer layer 22 and substrate 24. Shields 12 and 20 shield sensor stack 16 from magnetic flux and are preferably NiFe. Dielectric gap layers 14 and 18 are the subject of the present invention and are preferably formed of silicon nitride using a plasma enhanced chemical vapor deposition process (PECVD) as described below. The function of first dielectric gap 14 is to provide insulation between first shield 12 and sensor stack 16. Similarly, the function of second dielectric gap layer 18 is to provide insulation between sensor stack 16 and second shield 20. If there is not good insulation between these layers, the sense current will go through shields 12 and 20 rather than through sensor stack 16, resulting in little or no signal. Silicon nitride is the preferred material for dielectric gap layers 14 and 18 because it can be formed at relatively low temperatures using the PECVD process, it is an inherently dense material, it has very good dielectric strength and low leakage current and it has excellent corrosion resistance. Spacer layer 22 provides insulation between shield 20 and substrate 24 and is preferably $Al_2O_3$.

Figure 2:
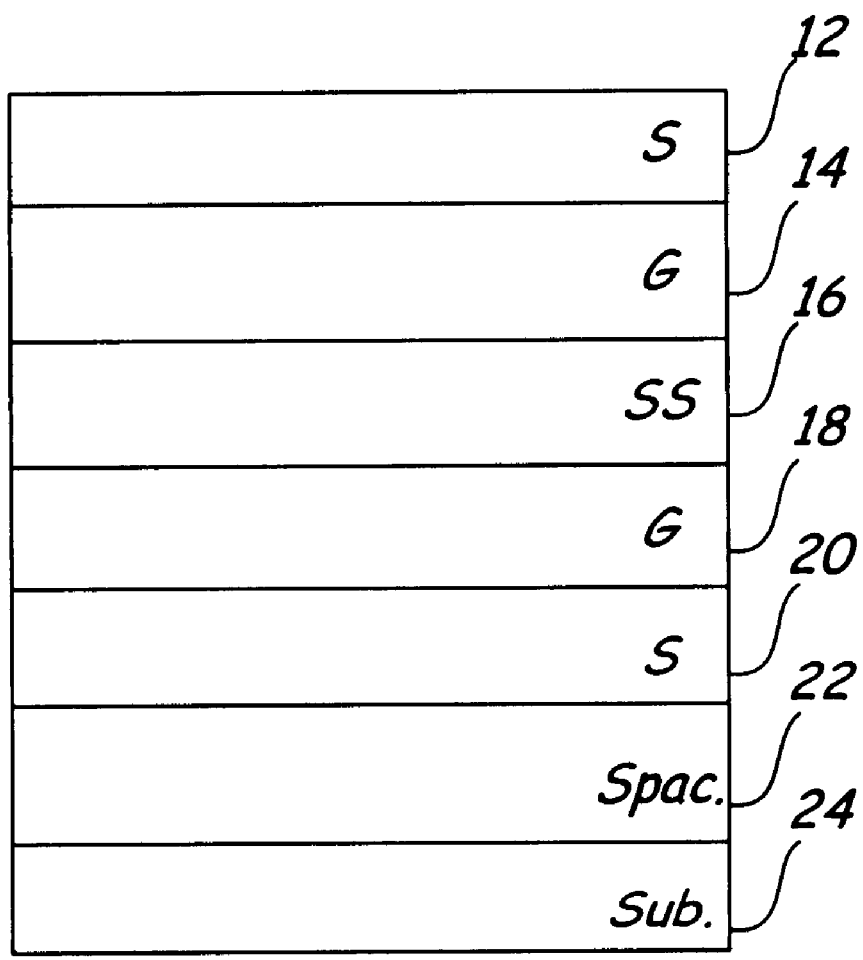
FIG. 2 shows a flow diagram summarizing a preferred process for forming a dielectric gap material in accordance with the present invention.

FIG. 2 shows a flow diagram summarizing a preferred process for forming a dielectric gap material in accordance with the present invention. With the assistance of plasma, the PECVD process of the present invention can be performed at much lower temperatures (below 200° C.) than conventional CVD processes, and thus is compatible with current MR head manufacturing processes. As shown in FIG. 2, a first step in the process is placement of a wafer or a substrate (with an MR sensor stack) in a PECVD reactor. (Block 30). The PECVD reactor is pumped down to about $10^{-3}$ torr to eliminate any oxygen and is then flushed with nitrogen. (Block 32). The wafer or substrate is heated to between about 180° C. to 220° C., with 200° C. being a preferred temperature. (Block 34). Gases that are used to form silicon nitride are fed into the reactor. (Block 36). In a preferred embodiment, the gases and their flow rates are as follows: $SiH_4$:100–150 sccm (standard cubic centimeter minute); He:900–1200 sccm; $N_2$:50–150 sccm; $NH_3$:10–20 sccm. The pressure in the reactor during the deposition process is preferably maintained at 60–100 mT. The RF power of the reactor electrode is turned on. In a preferred embodiment, the reactor electrode is operated at 50–75 W and 13.54 MHz to generate an electric field that produces plasma in the reactor. (Block 38). The gases react resulting in a deposition of silicon nitride on the wafer or substrate. (Block 40). The electric field present during the reaction makes the gases more reactive to one another, making high temperatures like those used in conventional CVD unnecessary. After the deposition, the wafer or substrate with the deposited silicon nitride is removed from the reactor. (Block 42).

Figure 3:
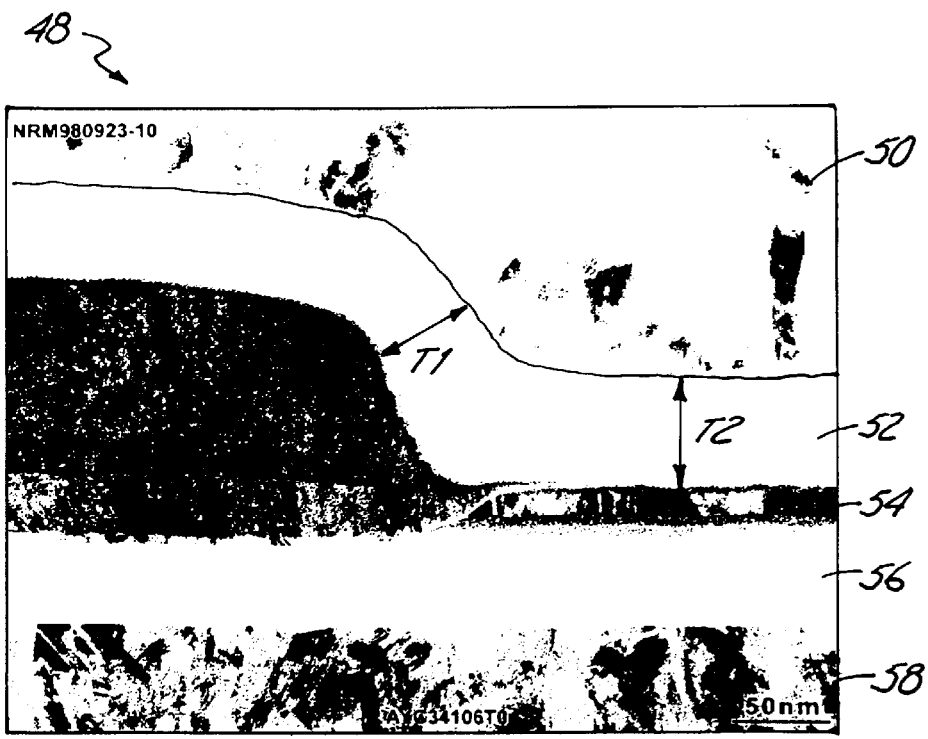
FIG. 3 shows a cross-sectional view of an MR head, which is based on a transmission electron microscopy (TEM) image.
Figure 4:
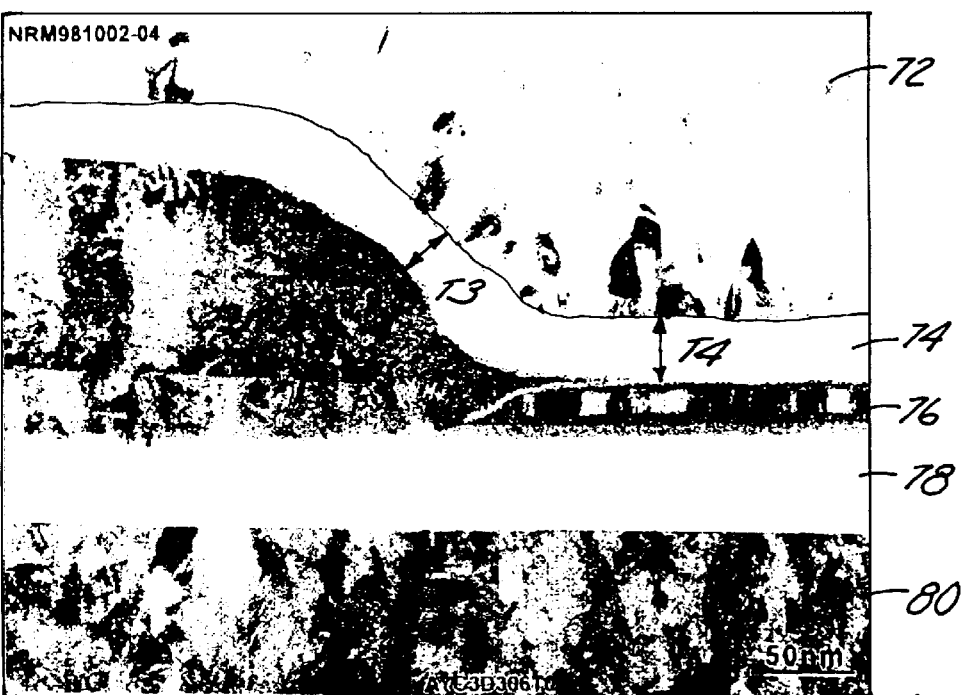
FIG. 4 shows a cross-sectional view of an MR head with thinner gap layers than those shown in FIG. 3.

The improved step coverage using the material and techniques of the present invention will be discussed next with respect to FIGS. 3 and 4. FIG. 3 shows a cross-sectional view of MR head 48, which is based on a transmission electron microscopy (TEM) image. MR head 48 includes shield 50, second half-gap 52, sensor stack 54, first half-gap 56 and shield 58. First half-gap 56 and second half-gap 52 are silicon nitride deposited as described above with respect to FIG. 2. First half-gap 56 is about 500A in thickness, while second half-gap 52 is about 600 Å thick. Second half-gap 52 is thinner at sloped region 51 than at flat region 53, but the ratio of the thickness at sloped region 51 (i.e., Ti) to the thickness at flat region 53 (i.e., T2) is between 80 to 85 percent. In other words, the step coverage on such an MR structure is about 80 to 85 percent. RF sputtered $Al_2O_3$ gap material on the same MR structure and design provides a step coverage of only about 30 to 35 percent. Therefore, the improvement in step coverage of more than 250 percent is significant.

A reduction in the thickness of the second half-gap does not change the step coverage percentage. FIG. 4 shows a cross-sectional view of an MR head based on a TEM image. MR head 70 includes shield 72, second half-gap 74, sensor stack 76, first half-gap 78 and shield 80. MR head 70 uses the same design and materials as MR head 48 shown in FIG. 3, except that a different thickness of the second half-gap is used. For the MR head shown in FIG. 4, second half-gap 74 is 270 Å thick. Even at this reduced thickness of the second half-gap, a step coverage (T3/T4) of about 80 percent is obtained.

The chemical composition of the silicon nitride dielectric gaps formed according to the present invention are characterized using techniques of Rutherford Backscattering Spectrometry (RBS) and Hydrogen Forward Scattering (HFS). Using these techniques, the composition of the silicon nitride dielectric gaps has been determined to be 40.9% silicon (Si), 37.1% nitrogen (N) and 22.0% hydrogen (H). It has been determined that a preferred range for these elements is 38–44% Si, 35–37% N and 21–24% H. The ratio of nitrogen to silicon is preferably in the range of 0.8–0.97. The crystalline structure of the silicon nitride dielectric gaps formed according to the present invention is characterized using x-ray diffraction. No diffraction peak was found for the dielectric gaps, so the material is believed to have an amorphous structure.

Figure 5:
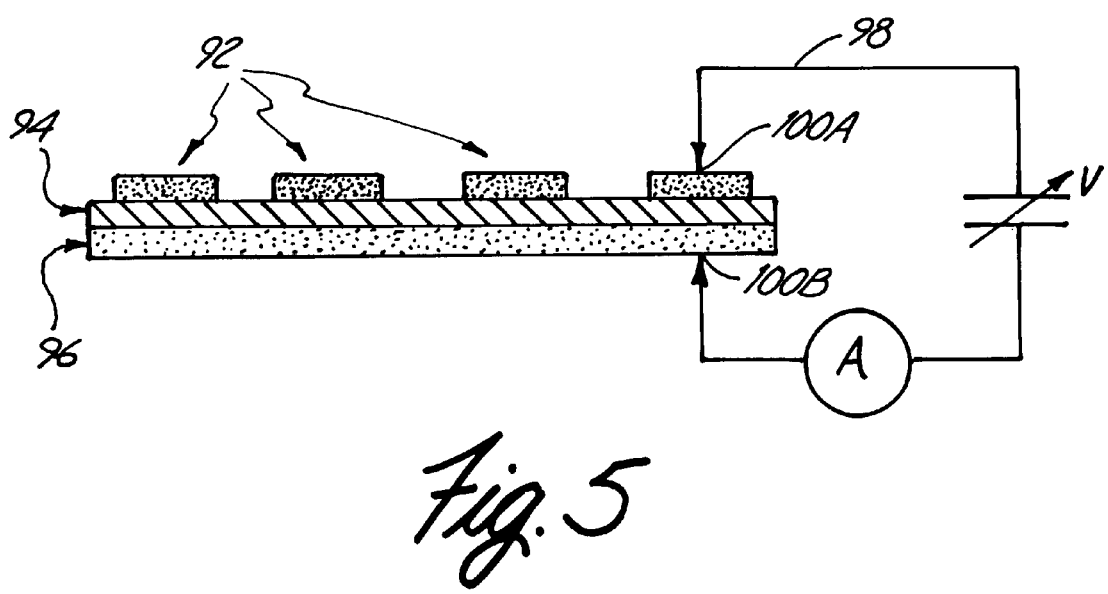
FIG. 5 shows a test structure for measuring I–V characteristics of the dielectric gaps formed according to the present invention.

The I–V characteristics of the dielectric gaps formed according to the present invention have been measured using a test structure like that shown in FIG. 5. Test structure 90 includes electrodes 92, dielectric gap material 94, conductive substrate 96 and probe station 98. Dielectric gap material 94 is deposited on conductive substrate 96. Next, a conductive film is deposited over dielectric gap material 94, which is then patterned into 200 micrometer by 200 micrometer electrodes 92. Probe station 98 electrically contacts conductive substrate 96 and electrodes 92. By moving probe tips 100A and 100B from one electrode to another, many patterns can be tested. Films with thicknesses ranging from 400 Å to 800 Å were deposited for I–V measurement. RF sputtered $Al_2O_3$ films were also tested as a reference. The I–V characteristics of the dielectric gaps formed according to the present invention and those of RF sputtered $Al_2O_3$ films are illustrated in FIG. 6.

Figure 6:
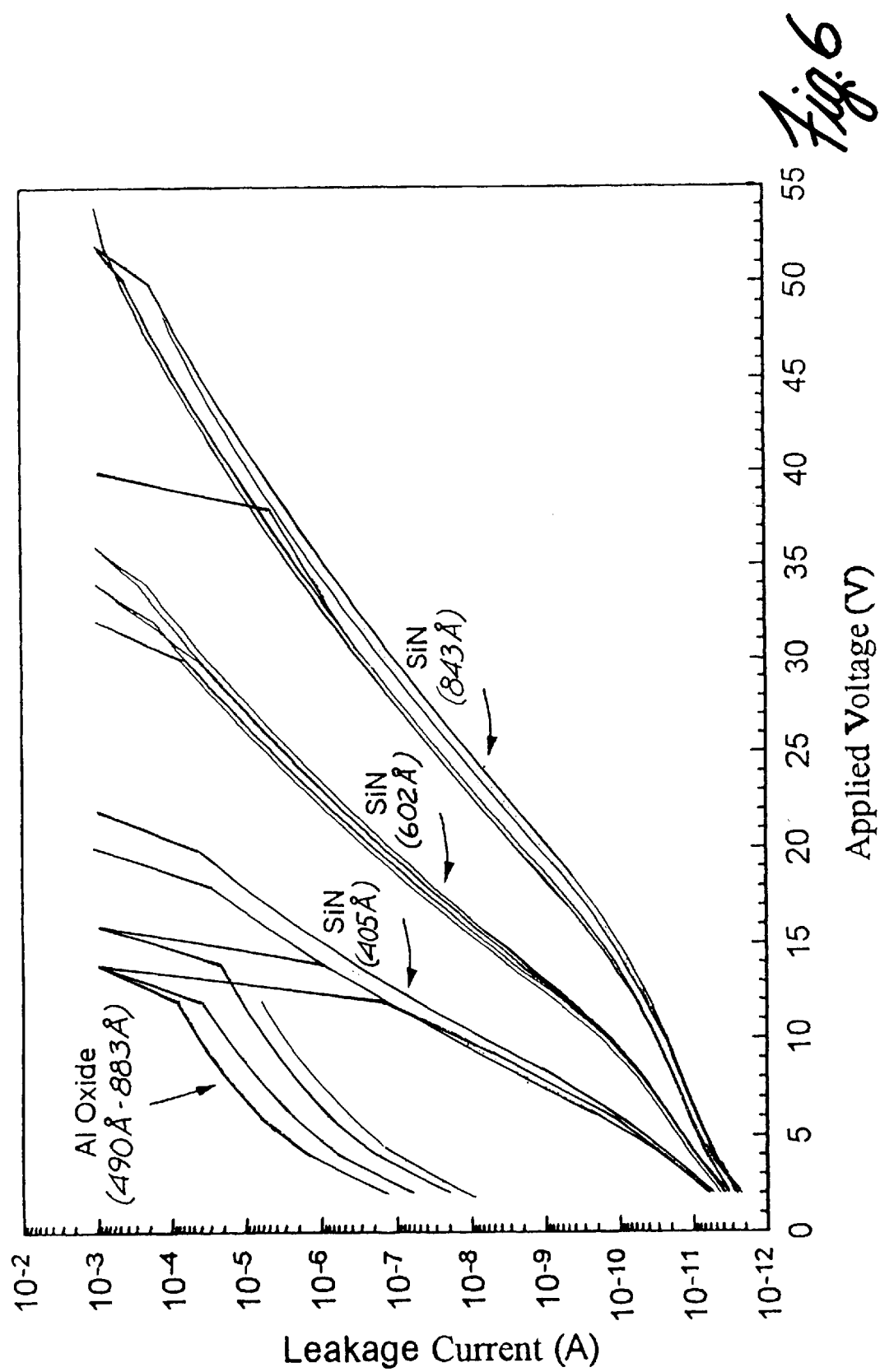
FIG. 6 shows I–V characteristics of the dielectric gaps formed according to the present invention and those of RF sputtered $Al_2O_3$ films.

As shown in FIG. 6, the leakage current increases for both the dielectric gap material of the present invention (SiN) and the RF sputtered $Al_2O_3$ films as the thickness of the film is reduced. However, the SiN dielectric gap material has a much smaller leakage current at a given applied voltage than RF sputtered $Al_2O_3$ films. For example, when the applied voltage is two volts, the leakage current of the SiN dielectric gap material is about 100 to 1000 times smaller than that of RF sputtered $Al_2O_3$ films. Therefore, the resistance of the SiN dielectric gap material is 100 to 1000 times bigger than that of RF sputtered $Al_2O_3$ films at two volts, suggesting that the SiN dielectric gap will provide much better isolation for MR sensor stacks. Multiple tests were taken at each thickness to ensure the accuracy of the data, so multiple lines are shown in FIG. 6 for each thickness.

Also, as shown in FIG. 6, a given leakage current is obtained at a much higher voltage in the SiN dielectric gap than in RF sputtered $Al_2O_3$. For example, when the leakage current is $10^{-7}$ Å, the applied voltage on the SiN dielectric gap material has to be more than five times higher than that on RF sputtered $Al_2O_3$ films. Therefore, the SiN dielectric gap material can withstand a much higher voltage across the gap and is more resistant to electrostatic discharge.

Although the present invention has been described with reference to preferred embodiments, workers skilled in the art will recognize that changes may be made in form and detail without departing from the spirit and scope of the invention.

What is claimed is:

1. An MR head comprising:
   a sensor stack; and
   isolation means formed on the sensor stack for isolating the sensor stack from external fields where in the isolation means has a step coverage greater than about 80 percent.

2. The MR head of claim 1 wherein the isolation means comprises a silicon nitride film.

3. The MR head of claim 2 wherein the silicon nitride film has a nitrogen to silicon ratio of between about 0.8 and 0.97.

4. The MR head of claim 1 wherein the isolation means is a dielectric film comprising from about 38% to 44% by volume of Si, from about 35% to 37% by volume of N, and from about 21% to 24% by volume of H.

5. The MR head of claim 1 wherein the isolation means is formed on the sensor stack by plasma enhanced chemical vapor deposition.

6. The MR head of claim 1 wherein the leakage current of the isolation means is less than about $10^{-10}$ amps at an applied voltage of 2 volts for a thickness of the isolation means less than about 900 Å.

7. The MR head of claim 1 wherein the resistance of the isolation means at an applied voltage of 2 volts is greater than about 100 times higher than the resistance of an $Al_2O_3$ film of the same thickness at the same applied voltage.

8. A dielectric film for use in an MR head, comprising from about 38% to 44% by volume of Si, from about 35% to 37% by volume of N, and from about 21% to 24% by volume of H.

9. The dielectric film of claim 8 wherein the leakage current of the dielectric film is less than about $10^{-10}$ amps at an applied voltage of 2 volts for a thickness of the dielectric film less than about 900 Å.

10. The dielectric film of claim 8 wherein the dielectric film is formed using plasma enhanced chemical vapor deposition.

11. The dielectric film as claimed in claim 8 wherein the dielectric film has a step coverage greater than about 80%.

12. The dielectric film of claim 8 wherein the resistance of the dielectric film at an applied voltage of 2 volts is greater than about 100 times higher than the resistance of an $Al_2O_3$ film of the same thickness at the same applied voltage.

13. An MR head comprising:

a sensor stack; and a silicon nitride film formed on the sensor stack for isolating the sensor stack from external fields, wherein the silicon nitride film has a nitrogen to silicon ratio of between about 0.8 and 0.97.

14. The MR head of claim 13 wherein the silicon nitride film comprises from about 38% to 44% by volume of Si, from about 35% to 37% by volume of N, and from about 21% to 24% by volume of H.

15. The MR head of claim 13 wherein the silicon nitride film is formed on the sensor stack by plasma enhanced chemical vapor deposition.

16. The MR head of claim 13 wherein the silicon nitride film has a step coverage greater than about 80%.

17. The MR head of claim 13 wherein a resistance of the silicon nitride film at an applied voltage of 2 volts is greater than about 100 times higher than a resistance of an $Al_2O_3$ film of an equal thickness at the same applied voltage.

18. The MR head of claim 13 wherein a leakage current of the silicon nitride film is less than about $10^{-10}$ amps at an applied voltage of 2 volts for a thickness of the silicon nitride film less than about 900 Å.

* * * * *

UNITED STATES PATENT AND TRADEMARK OFFICE
CERTIFICATE OF CORRECTION

PATENT NO.     : 6,449,132 B1
DATED          : September 10, 2002
INVENTOR(S)    : Liu Yang et al.

It is certified that error appears in the above-identified patent and that said Letters Patent is hereby corrected as shown below:

<u>Column 3,</u>
Line 38, delete "500A", insert -- 500Å --

Signed and Sealed this

Eighteenth Day of November, 2003

JAMES E. ROGAN
*Director of the United States Patent and Trademark Office*